United States Patent
Dortschy et al.

(10) Patent No.: US 10,595,219 B2
(45) Date of Patent: Mar. 17, 2020

(54) FIRST NETWORK NODE, A SECOND NETWORK NODE AND METHODS THEREIN

(71) Applicant: Telefonaktiebolaget LM Ericsson (publ), Stockholm (SE)

(72) Inventors: Boris Dortschy, Hägersten (SE); Patryk Urban, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 15/304,061

(22) PCT Filed: Apr. 15, 2014

(86) PCT No.: PCT/SE2014/050469
§ 371 (c)(1),
(2) Date: Oct. 13, 2016

(87) PCT Pub. No.: WO2015/160293
PCT Pub. Date: Oct. 22, 2015

(65) Prior Publication Data
US 2017/0034716 A1  Feb. 2, 2017

(51) Int. Cl.
*H04W 24/06* (2009.01)
*H04W 24/02* (2009.01)
(Continued)

(52) U.S. Cl.
CPC ............. *H04W 24/06* (2013.01); *H04L 27/12* (2013.01); *H04W 24/02* (2013.01); *H04W 24/10* (2013.01)

(58) Field of Classification Search
None
See application file for complete search history.

(56) References Cited

U.S. PATENT DOCUMENTS

| 2,416,741 A | * | 3/1947 | Eltgroth | G01S 13/84 342/125 |
| 3,300,780 A | * | 1/1967 | Mason | G01S 13/84 342/125 |

(Continued)

FOREIGN PATENT DOCUMENTS

| EP | 2154802 A1 | 2/2010 |
| WO | 2012148938 A1 | 11/2012 |
| WO | 2013139367 A1 | 9/2013 |

OTHER PUBLICATIONS

International Search Report and Written Opinion for Application No. PCT/SE2014/050469 dated Dec. 9, 2014, 9 pages.
(Continued)

*Primary Examiner* — Joseph A Bednash
(74) *Attorney, Agent, or Firm* — NDWE LLP

(57) ABSTRACT

A method in a first network node for determining a latency of a transmission link between the first network node and a second network node in a communications network. The first network node transmits an electromagnetic signal to the second network node over the transmission link as a first Frequency-Division Multiplexed (FDM) signal comprised in a first electromagnetic carrier also comprising payload data. The first network node receives the electromagnetic signal from the second network node over the transmission link, wherein the electromagnetic signal has been transmitted from the second network node as a second FDM signal comprised in a second electromagnetic carrier also comprising payload data. The first network node determines the latency of the transmission link based on a phase difference between the transmitted electromagnetic signal and the received electromagnetic signal.

18 Claims, 14 Drawing Sheets

(51) Int. Cl.
  *H04W 24/10* (2009.01)
  *H04L 27/12* (2006.01)

(56) References Cited

U.S. PATENT DOCUMENTS

| | | | | |
|---|---|---|---|---|
| 7,184,410 | B1* | 2/2007 | Frankel | H04B 10/25137 370/252 |
| 2005/0129400 | A1* | 6/2005 | Kim | H04J 14/0227 398/67 |
| 2011/0076027 | A1* | 3/2011 | Kiuchi | H04B 10/2575 398/141 |
| 2014/0328593 | A1* | 11/2014 | Lamb | H04B 10/27 398/66 |
| 2015/0256974 | A1* | 9/2015 | Zobenko | H04W 4/023 455/456.3 |
| 2016/0112136 | A1* | 4/2016 | Urban | H04B 10/2504 398/66 |

OTHER PUBLICATIONS

Written Opinion of the International Preliminary Examining Authority for Application No. PCT/SE2014/050469 dated Apr. 20, 2016, 6 pages.
International Preliminary Report on Patentability for Application No. PCT/SE2014/050469 dated Jul. 26, 2016, 6 pages.
M. Bousonville et al., "Signal Delay Measurement Method for Timing Systems," May 2010, pp. 403-407, TUPSM088, Proceedings of BIW10, Santa Fe, New Mexico, United States.
M. Bousonville, "Optische Übertragung phasensynchroner Taktsignale unter Verwendung des Wellenlängen-Multiplex-Verfahrens," May 2009, 188 pages, Dissertation, Department of Electrical Engineering and Information Technology, The Technical University of Darmstadt, Germany.
Communication pursuant to Article 94(3) EPC for Application No. 14729477.1, dated Jul. 31, 2017, 4 pages.
Communication under Rule 71(3) EPC for Application No. 14729477.1, dated Jul. 11, 2018, 98 pages.
Decision to grant a European patent pursuant to Article 97(1) EPC for Application No. 14729477.1, dated Sep. 20, 2018, 2 pages.

* cited by examiner

FIRST NETWORK NODE, A SECOND NETWORK NODE AND METHODS THEREIN

CROSS-REFERENCE TO RELATED APPLICATIONS

This application is a National stage of International Application No. PCT/SE2014/050469, filed Apr. 15, 2014, which is hereby incorporated by reference.

TECHNICAL FIELD

Embodiments herein relate to a first network node, a second network node and methods therein. In particular, it relates to latency of transmission links.

BACKGROUND

Information about latency of a fronthaul transmission link, or in other words the fronthaul link latency, is essential for modern radio systems, such as $3^{rd}$ Generation Partnership Project (3GPP) Universal Mobile Telecommunications System (UMTS) or 3GPP Long Term Evolution (LTE) in order to be able to coordinate, e.g., multi antenna systems or to set and/or adjust radio link parameters to optimum levels. Latency is a time interval between the transmitter sends a signal and arrival of the signal at the receiver. For example network latency is measured either as one-way or round-trip delay. The fronthaul transmission link is the link between a base station baseband or digital unit to a remote radio head and antenna.

For example, the performance of wireless Multiple Input Multiple Output (MIMO) is strongly relying on close alignment and phase-coordinated transmission and reception of the individual antenna signal over the fronthaul transmission link. A misalignment or timing uncertainty in radio systems is expressed as Timing Alignment Error (TAE). Maximum allowable TAE varies between about 30 ns and 1 µs depending on the specific requirement for the specific fronthaul case, e.g. Radio Base Station (RBS) antenna, RBS and several MIMO antenna, different RBS/LTE-Time Domain Duplexing. Each km of standard optical cable introduces a transmission delay of 5 µs. Therefore, a problem is that even short transmission cables will result in violation of radio standard requirements and, without latency compensation, render the application of fiber in the fronthaul pointless.

SUMMARY

Since it is very difficult to determine the latency of the transmission link with high accuracy, such that the latency may be compensated for in order for the transmission to meet the requirement of the radio standard, it is an object of embodiments herein to provide an improved way of determining the link latency of a transmission link.

According to a first aspect of embodiments herein, the object is achieved by a method in a first network node for determining a latency of a transmission link between the first network node and a second network node in a communications network. The first network node transmits an electromagnetic signal to the second network node over the transmission link as a first Frequency-Division Multiplexed, FDM, signal comprised in a first electromagnetic carrier also comprising payload data.

The first network node further receives the electromagnetic signal from the second network node over the transmission link, wherein the electromagnetic signal has been transmitted from the second network node as a second FDM signal comprised in a second electromagnetic carrier also comprising payload data.

The first network node further determines the latency of the transmission link based on a phase difference between the transmitted electromagnetic signal and the received electromagnetic signal.

According to a second aspect of embodiments herein, the object is achieved by a first network node adapted to determine a latency of a transmission link between the first network node and a second network node in a communications network. The first network node is adapted to transmit an electromagnetic signal to the second network node over the transmission link as a first FDM signal comprised in a first electromagnetic carrier also comprising payload data.

The first network node is further adapted to receive the electromagnetic signal from the second network node over the transmission link, wherein the electromagnetic signal has been transmitted from the second network node as a second FDM signal comprised in a second electromagnetic carrier also comprising payload data.

The first network node is further adapted to determine the latency of the transmission link based on a phase difference between the transmitted electromagnetic signal and the received electromagnetic signal.

According to a third aspect of embodiments herein, the object is achieved by a method in a second network node for enabling the determining of a latency of a transmission link between a first network node and the second network node in a communications network. The second network node receives from the first network node an electromagnetic signal over the transmission link as a first FDM signal comprised in a first electromagnetic carrier also comprising payload data.

The second network node further transmits the electromagnetic signal to the first network node over the transmission link as a second FDM signal comprised in a second electromagnetic carrier also comprising payload data. This enables the first network node to determine the latency of the transmission link based on a phase difference between the electromagnetic signal as transmitted from the first network node and the electromagnetic signal as received by the first network node after transmission from the second network node.

According to a fourth aspect of embodiments herein, the object is achieved by a second network node adapted to enable the determining of a latency of a transmission link between a first network node and the second network node in a communications network. The second network node is adapted to receive from the first network node an electromagnetic signal over the transmission link as a first FDM signal comprised in a first electromagnetic carrier also comprising payload data.

The second network node is further adapted to transmit the electromagnetic signal to the first network node over the transmission link as a second FDM signal comprised in a second electromagnetic carrier also comprising payload data. This enables the first network node to determine the latency of the transmission link based on a phase difference between the electromagnetic signal as transmitted from the first network node and the electromagnetic signal as received by the first network node after transmission from the second network node.

According to a fifth aspect of embodiments herein, the object is achieved by a computer program, comprising instructions which, when executed on at least one processor in the first network node, cause the first network node to carry out the method according to the first aspect of embodiments herein.

According to a sixth aspect of embodiments herein, the object is achieved by a carrier containing the computer program of the previous aspect of embodiments herein, wherein the carrier is one of an electronic signal, optical signal, radio signal, or computer readable storage medium.

According to a seventh aspect of embodiments herein, the object is achieved by a computer program, comprising instructions which, when executed on at least one processor in the second network node, cause the second network node to carry out the method according to the third aspect of embodiments herein.

According to an eighth aspect of embodiments herein, the object is achieved by a carrier containing the computer program of the previous aspect of embodiments herein, wherein the carrier is one of an electronic signal, optical signal, radio signal, or computer readable storage medium.

Hence, the first network node determines the latency of the transmission link based on the phase difference between the electromagnetic signal as transmitted from the first network node and the electromagnetic signal as received by the first network node.

Since, the first network node transmits the electromagnetic signal to the second network node and receives the electromagnetic signal from the second network node over the transmission link as the FDM signals comprised in the electromagnetic carriers also comprising payload data, the first network node determines the latency of the transmission link in an improved way.

An advantage with embodiments herein is that the transmission link doesn't need to be exclusively available for the determination of the link latency. The determination may be carried out while some of the payload data is transmitted between the first network node and the second network node. In this way the performance of the first network node, the second network node and the communications network is improved.

Yet another advantage with embodiments herein is that by using the first electromagnetic carrier also comprising payload data the cost and complexity of the determination is further reduced since the same equipment may be used for transmitting and receiving the electromagnetic signal as for transmitting and receiving the payload and the reference signal which in any case will be present.

A further advantage with embodiments herein is that by using the FDM signals to transmit the electromagnetic signal over the transmission link, the cost for measuring the latency of the transmission link is reduced since low bandwidth components may be used for the first network node, the second network node and the transmission link.

A further advantage with embodiments herein is that continuous tracking of the latency of the transmission link may be performed, for example by using a frequency reference as the electromagnetic signal.

A further advantage with embodiments herein is that they allow determining the link latency very accurately based on a combination of the results of the phase comparison performed for different frequencies of the electromagnetic signal.

BRIEF DESCRIPTION OF THE DRAWINGS

Examples of embodiments herein are described in more detail with reference to attached drawings in which.

DETAILED DESCRIPTION

Figure 1:
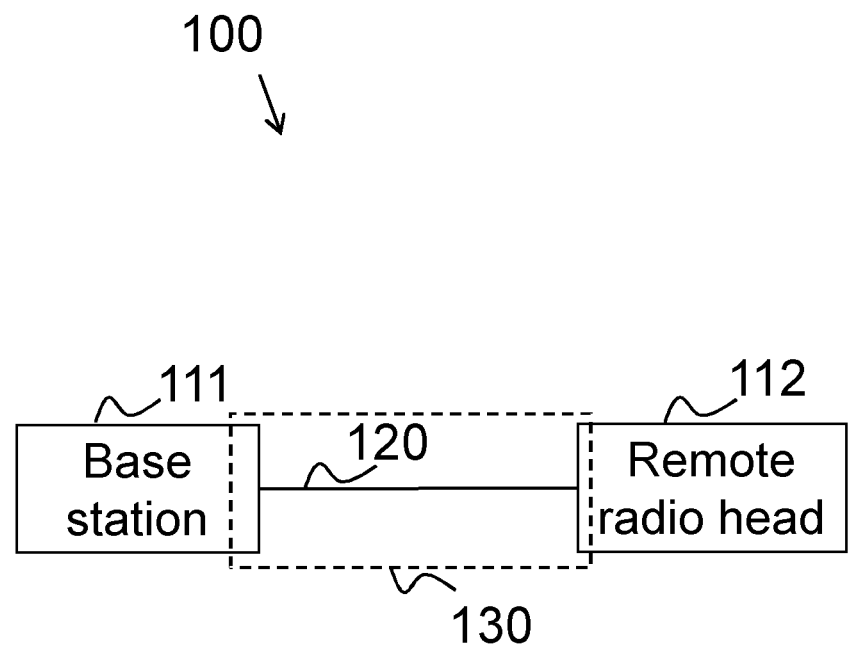
FIG. 1 is a schematic block diagram illustrating embodiments of a communications network.

As part of developing embodiments herein, a problem will first be identified and discussed.

Typical application of fiber in the fronthaul is based on high-bandwidth digital transmission or is based on analogue, grey transmission over several fibers, e.g. for up- and downstream, or based on Wavelength Division Multiplexing (VVDM) based bi-directional fibers. This allows utilizing standard digital techniques for latency or round-trip time measurements or applying reflective Optical Time Domain Reflectometry (OTDR) and/or Optical Frequency Domain Reflectometry (OFDR) measurements with test signals of high bandwidth and fairly high power to achieve required dynamic ranges.

Standard latency measurement techniques as can be used with digital systems or WDM systems are not applicable for all transmission systems, for example for power and/or bandwidth reasons. For example, low cost fronthaul links may not be implemented with digital or WDM transmission systems. Reflectometry based methods for example result in additional complexity and cost of the transmission system.

Further, fronthaul links cannot be assumed to be exclusively available, meaning signal distribution shut-down, for maintenance or performance measurement purposes on a regular, frequent basis. In case of transmission of analogue radio signals, the bandwidth of signals may be only of few MHz and transmission may be performed with much lower power than when using digital transmission. Both the bandwidth and the power of signals that may be used for fronthaul links may be too low for the application of digital methods or reflective link measurements. In-built control channels are typically of low performance and neither exploitable for latency measurements in the range of ns.

Embodiments herein provide a way to determine a round-trip time and thus the link latency of the transmission link. In embodiments herein test signals are provided from a base station or Radio Unit (RU) site and looped, i.e. returned, at the remote site. Thus, at the originating site both the original signal and the forth and back transmitted signal may be completed. The determination of the latency of the link, is based on this phase comparison. Results from using test signals with different frequencies may be combined to achieve very high accuracy An advantage with embodiments herein, as will be explained further below, is that it is possible to combine measurements using signals with different frequencies to obtain results of the determination of the link latency with a high resolution and low error at the same time as the transmission link may be used for transmission of payload data on other sub-carriers. For example it is possible to use low frequency test signals over sub-carriers, unmodulated sub-carriers as high frequency, though apparently still low bandwidth, test signals for measurements which interrupt transmission only on individual sub-carriers.

In transmission systems that work with Intermediate Frequency (IF) carriers, i.e. converts Radio Frequency (RF) signals to IF signals, and that need accurate reverse mixing of the IF signals (i.e. IF to RF), a frequency reference or sync-signal may be provided and/or be available at both the base station and at the remote site in order to have coordinated up- and down-mixing of the RF-signals. Exploiting the continuous provisioning of the frequency reference or sync-signal as even yet another test signal allows for precise and continuous tracking of link latency changes down to a pico-second scale, depending on the frequency basis of the frequency reference or sync signal and the measurement accuracy.

Another advantage of embodiments herein is that as signal magnitude is only of indirect importance the test signals may be amplified at the remote site in order to refresh the test signal for improved Signal-to-Noise-Ratio (SNR).

In embodiments herein a latency of a transmission link is determined. Further, in embodiments herein the determination of the latency of the link is based on a phase shift of an electromagnetic signal. The electromagnetic signal has been transmitted over the transmission link as an FDM or SCM signal on an electromagnetic carrier also carrying payload data.

FIG. 1 depicts a communications network 100 in which embodiments herein may be implemented. The communications network 100 may for example be a 3GPP network, such as an LTE, WCDMA or GSM network, or any other communications or data network that need strong timing alignment between the moment data is transmitted and received. For example, such other data network may comprise a measurement link.

The communications network 100 comprises a first network node 111, such as a base station or a RU. The base station may also be referred to as an RBS, a NodeB, an evolved Node B (eNB, eNode B), a base transceiver station (BTS), Access Point Base Station, base station router, or any other network unit capable of communicating with a mobile radio communications device, such as a user equipment.

The communications network 100 further comprises a second network node 112, such as a remote radio head. The remote radio head may for example comprise RF-hardware for providing radio communication with a mobile radio communication device, such as a user equipment.

The communications network 100 further comprises a transmission link 120 between the first network node 111 and the second network node 112. The transmission link 120 enables communication between the first network node 111 and the second network node 112. The transmission link may for example be implemented with an optical cable or with a copper cable.

A combination of parts of the first network node 111, the second network node 112 and the transmission link 120 may together constitute a transmission system 130. The transmission system 130 may be an FDM based transmission system, such as an SCM based transmission system. The transmission system 130 may for example be used for analog or digital fronthaul. The fronthaul may be implemented by optical means, such as one or more optical cables, or by electrical means, such as one or more copper cables. Analog optical fronthaul may for example be based on Fiber-to-the-Radiohead and reach-extended Radio Dot System (RDS) solutions.

Figure 2:
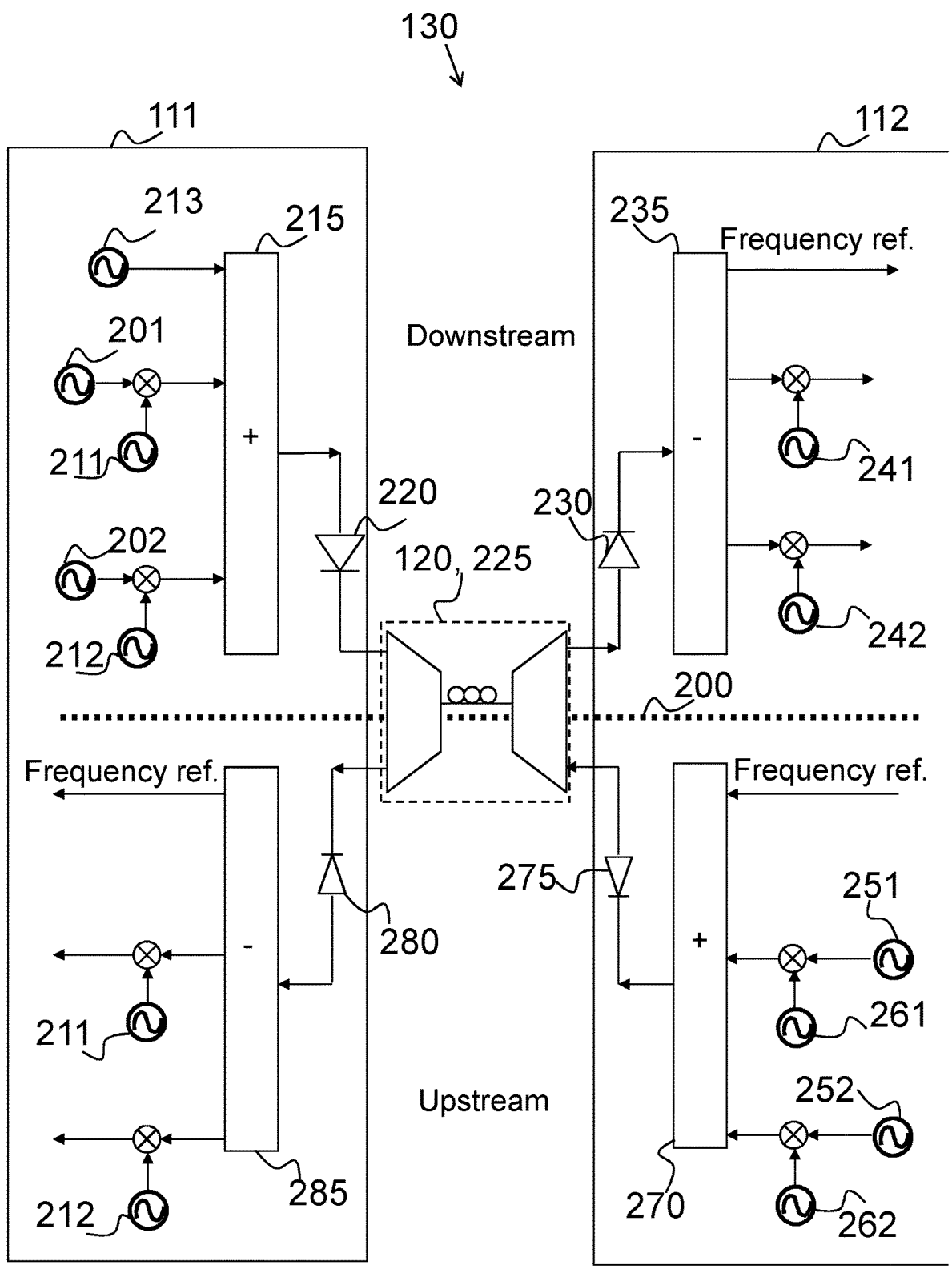
FIG. 2 is a combined flowchart and block diagram illustrating embodiments of a first network node, a second network node and methods therein.

FIG. 2 depicts the parts of the first network node 111 and the second network node 112 that may constitute the transmission system 130 in further detail. FIG. 2 is further a flow diagram illustrating a flow of signals in the first network node 111 and in the second network node 112 and between the first and second network nodes 111, 112.

The SCM or FDM based transmission system 130 may be logically divided in a downstream part and an upstream part. Downstream refers to the flow of signals from the first network node 111 to the second network node 112. Upstream refers to the flow of signals from the second network node 112 to the first network node 111. This is illustrated in FIG. 2 with the hatched line 200.

The downstream part of the SCM or FDM based transmission system 130 may comprise the following actions and arrangement in order to transmit downstream signals.

The first network node 111 may comprise a signal generating part comprising several signal generators. The signal generators may generate signals for payload, sub-carriers and frequency reference. The first network node 111 may for example comprise a first payload generator 201 and a second payload generator 202. The payload may be RF or RF on IF signals at lower IF-frequencies or baseband. The signal generated by the first and second payload generators 201, 202 may be modulated onto a respective first and second sub-carrier signal which may respectively be generated by a first sub-carrier generator 211 and a second sub-carrier generator 212. The first sub-carrier signal may for example have a frequency of 200 MHz while the second sub-carrier signal may have a frequency of 500 MHz. The first network node 111 may of course produce more than two sub-carriers.

The frequency reference signal may be generated by a frequency reference generator 213. The frequency reference signal may be at defined and fixed frequency. In this example the frequency reference signal has a frequency of 100 MHz. The modulated sub-carriers and the frequency reference may be combined, for example in a multiplexer 215, resulting in an SCM signal. The combination of the modulated sub-carriers and the frequency reference may also be performed in a power combiner or diplexer or duplexer.

The payload signal and/or the frequency reference signal, which may be comprised in the SCM signal, may then be modulated onto an electromagnetic carrier, such as an optical carrier. The optical carrier may for example be produced by a laser. The modulation of the electromagnetic carrier may be performed by a modulation device 220, such as a directly modulated laser or an electro-absorption modulator or an electro-optical modulator or any other modulation device capable of modulating electromagnetic waves, for example any modulation device capable of externally modulating the output from a laser. External modulation devices also include modulators that are integrated with the laser.

The RF signal, such as the payload or frequency reference, may also be modulated on the electromagnetic carrier directly. For example, an RF signal at 1000 MHz may be combined directly with sub-carriers at 200 or 500 MHz.

For FDM systems, the payload signals may be generated at suitable middle frequencies equivalent to sub-carriers. For such a system the payload may be modulated directly on the electromagnetic carrier and then combined with other payloads through multiplexing. Example of such systems are WDM or multi-standard radio.

The electromagnetic carrier is then injected into the transmission link 120, 225.

At the other end of the transmission link 120, 225 the second network node 112 may comprise the following arrangement in order to receive downstream signals. The second network node 112 is adapted to receive the electromagnetic carrier, for example with a photodiode 230. The second network node 112 may comprise a de-multiplexer 235 to de-multiplex the received FDM/SCM signal. The de-multiplexing or splitting of the combined signal into the modulated sub-carriers and the frequency reference may also be performed in a power splitter or diplexer or duplexer.

The second network node 112 may further comprise several Local Oscillators (LO), such as a first LO 241 for demodulation of the payload generated by the first payload generator 201, and a second LO 242 for demodulation of the payload generated by the second payload generator 202, in the first network node 111. The LOs may be synchronized with the sub-carrier generators in the first network node 111 via the frequency reference signal. Further the first LO 241 may produce the same frequency as the first sub-carrier generator 211, while the second LO 242 may produce the same frequency as the second sub-carrier generator 212.

The SCM or FDM based transmission system 130 may be almost symmetric, meaning that the upstream part may in large correspond to a mirrored set-up of the downstream part.

The second network node 112 may comprise the following arrangement in order to transmit upstream signals. The second network node 112 may for example comprise a third payload generator 251 and a fourth payload generator 252. The signal generated by the third and fourth payload generators 251, 252 may be modulated onto a respective third and fourth sub-carrier signal which may respectively be generated by a third sub-carrier generator 261 and a fourth sub-carrier generator 262. The third and fourth sub-carriers may have the same frequency as the respective first and second sub-carriers. The third sub-carrier generator 261 may be implemented by the first LO 241 and the fourth sub-carrier generator 262 may be implemented by the second LO 242. The second network node 112 may of course produce more than two sub-carriers.

The frequency reference signal may be provided to the upstream in some embodiments.

The modulated sub-carriers may be combined, for example in a second multiplexer 270, resulting in a second SCM signal. The combination of the modulated sub-carriers and the frequency reference may also be performed in a power combiner or diplexer or duplexer.

The second SCM signal may then be modulated onto a second electromagnetic carrier, such as a second optical carrier. The optical carrier may for example be produced by a laser. The modulation of the second electromagnetic carrier may be performed by a second modulation device 275, such as a directly modulated laser or an electro-absorption modulator or an electro-optical modulator or any other modulation device capable of modulating electromagnetic waves, for example any modulation device capable of externally modulating the output from a laser. External modulation devices also include modulators that are integrated with the laser.

The electromagnetic carrier is then injected into the transmission link 120, 225.

At the other end of the transmission link 120, 225 the first network node 111 may comprise the following arrangement in order to receive upstream signals. The first network node 111 is adapted to receive the electromagnetic carrier, for example with a second photodiode 280. The first network node 111 may comprise a second de-multiplexer 285 to de-multiplex the received second SCM or FDM signal. The de-multiplexing or splitting of the combined signal into the modulated sub-carriers and the frequency reference may also be performed in a power splitter or diplexer or duplexer.

After de-multiplexing, the first network node 111 may demodulate the electromagnetic signals, such as payload signals and/or frequency reference signals, from the FDM signal, such as the SCM signal. This may be performed with the first and second sub-carrier generators 211, 212 or any other suitable signal generator.

Figure 3:
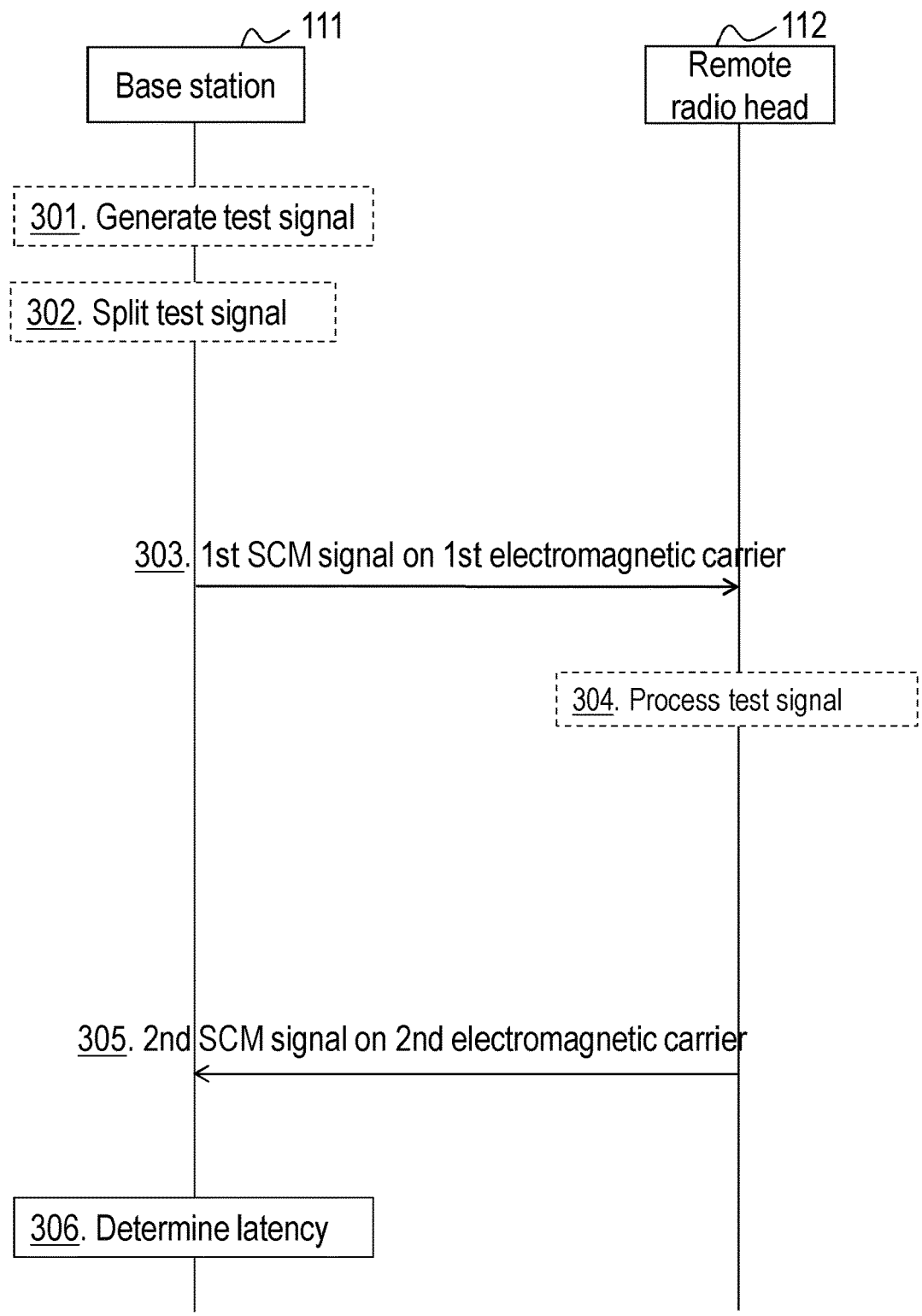
FIG. 3 is a combined flowchart and signaling diagram illustrating methods according to embodiments herein.

Actions for determining the latency of the transmission link 120 between the first network node 111 and the second network node 112 in the communications network 100, will now be described in a general way with reference to a combined flowchart and signaling diagram depicted in FIG. 3.

The FDM signals described below may be SCM signals and the actions of transmitting and receiving an electromagnetic signal over the transmission link 120 may be performed using an SCM based transmission system.

Action 301

The first network node 111 may generate an electromagnetic signal which will serve as a test signal for the purpose of determining the latency of the transmission link 120, 225. The electromagnetic signal may also be provided from elsewhere.

The electromagnetic signal may be any one or more of: the frequency reference signal, an unmodulated sub-carrier or sub-band, a modulated sub-carrier or sub-band and a modulation signal of a sub-carrier or sub-band.

Action 302

The first network node 111 may split the electromagnetic signal in two or more parts. A first part of the electromagnetic signal may correspond to the electromagnetic signal as transmitted from the first network node 111 below in action 303. Thus the phase of the first part of the electromagnetic signal corresponds to the phase of the transmitted electromagnetic signal. In action 306 below the phase of the first part of the electromagnetic signal may be compared with a phase of a second part of the electromagnetic signal as received from the second network node 112 after the second part of the electromagnetic signal has been transmitted from the first network node 111 to the second network node 112 over the transmission link 120 and transmitted back again over the transmission link 120 from the second network node 112.

Figure 4:
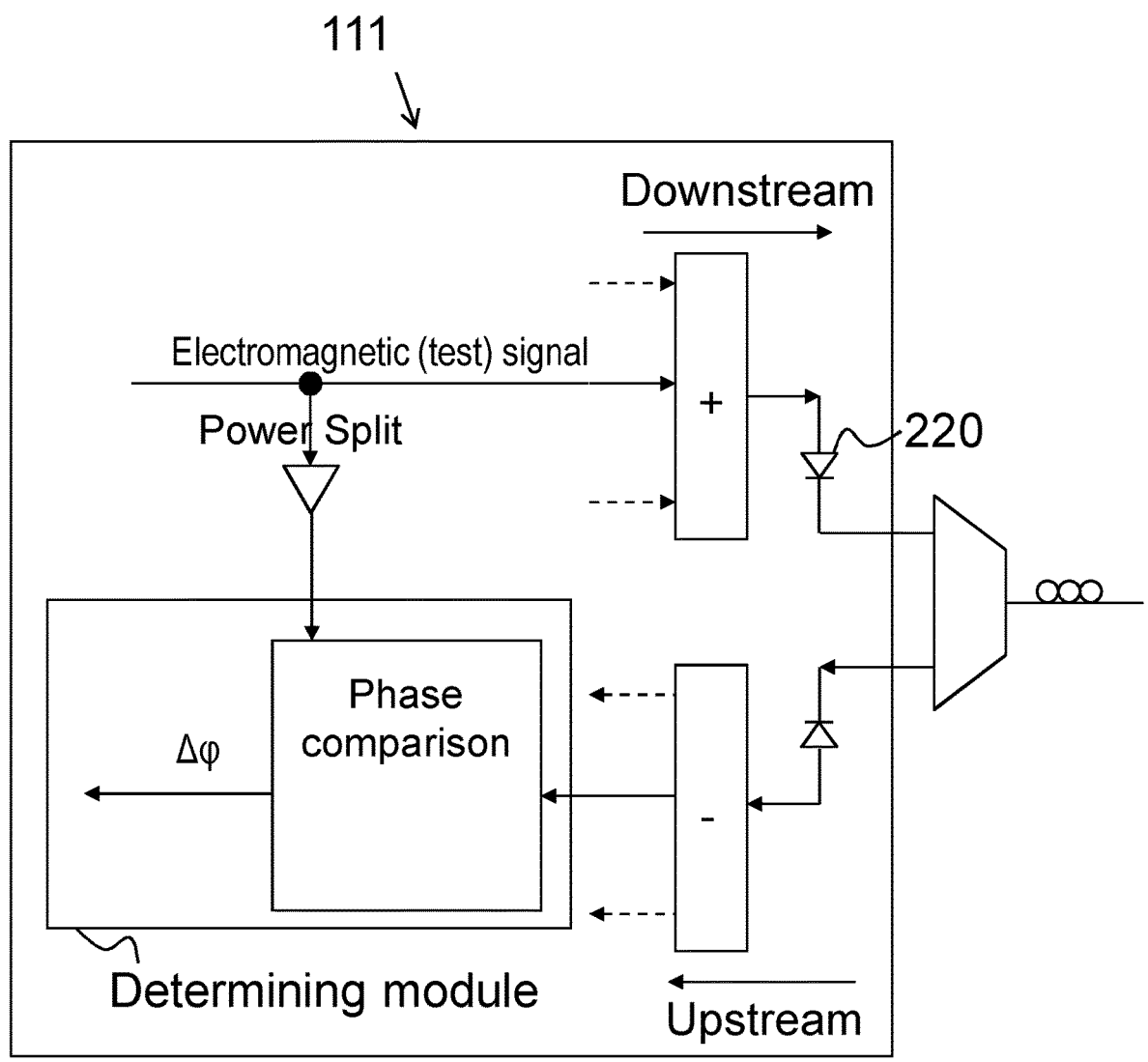
FIG. 4 is a combined flowchart and block diagram depicting embodiments of a first network node and a method in a first network node.

FIG. 4 illustrates how the electromagnetic signal may be generated, split, transmitted and received by the first network node 111 before the first network node 111 determines the latency of the transmission link 120.

Signal processing may be performed on the first part of the electromagnetic signal after splitting. Such signal processing may comprise amplification as illustrated in FIG. 4. Signal processing may also comprise adjusting the phase of the signal in order to compensate for side effects in the overall system. For example phase bias reduction may be performed to compensate for signal delays in amplifiers or signal route delays e.g. in the second network node 112.

Action 303

The first network node 111 transmits the electromagnetic signal to the second network node 112 over the transmission link 120 as a first FDM signal comprised in a first electromagnetic carrier also comprising payload data.

The transmitting of the electromagnetic signal may be performed by using the modulation device 220, which is the same modulation device 220 as for the payload data.

If the transmission link 130 is an electrical transmission link, e.g. comprising a copper cable, the electromagnetic signal may be transmitted without using the modulation device 220. In such a case the electromagnetic signal may be amplified before being transmitted, e.g. by a line-driver.

At the other end of the transmission link the second network node 112 receives the electromagnetic signal as the first FDM signal comprised in the first electromagnetic carrier also comprising payload data.

The second network node 112 may receive the electromagnetic carrier, such as an optical signal, by means of a photo diode, such as the photodiode 230. This may result in that the FDM signal is mixed down from e.g. optical frequencies on to a signal of combined IF/RF frequencies in the electrical domain.

Figure 5:
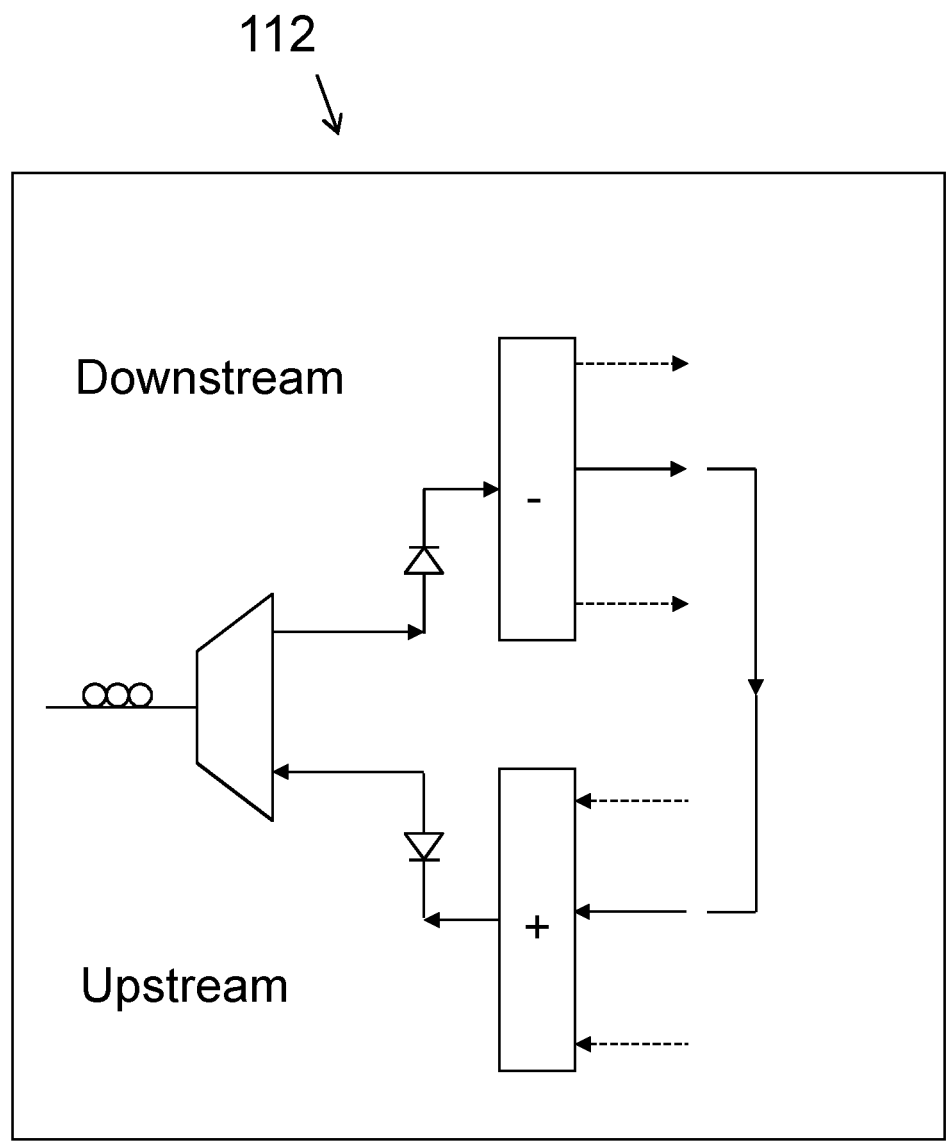
FIG. 5 is a combined flowchart and block diagram depicting embodiments of a second network node and a method in a second network node.

A basic embodiment of the signal flow in the second network node 112 is shown in FIG. 5.

This action is related to actions 1101 and 1301 below.

Action 304

Figure 6:
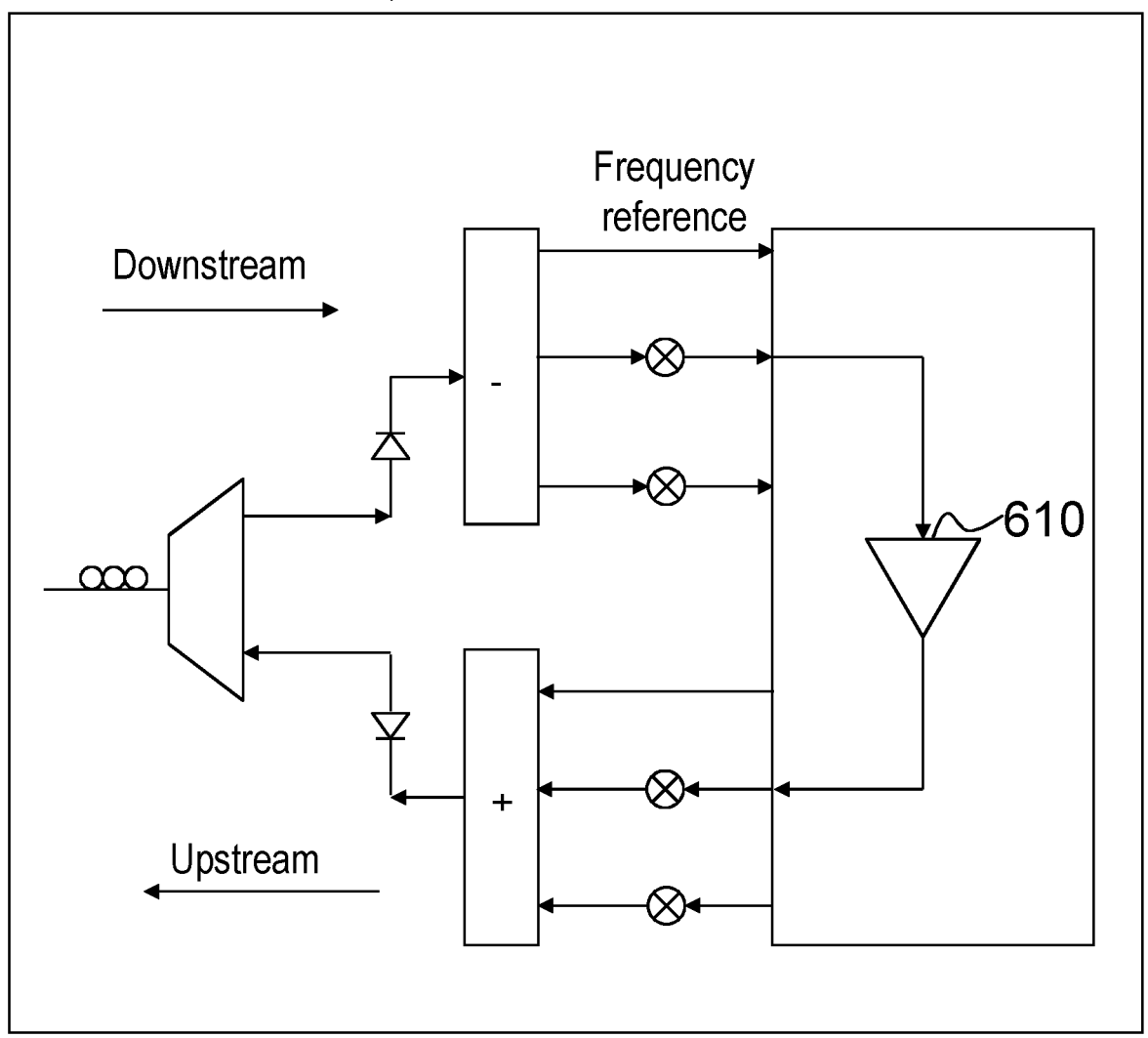
FIG. 6 is a combined flowchart and block diagram depicting further embodiments of a second network node and a method in a second network node.

In FIG. 5 the electromagnetic signal is looped-back to the first network node 111 immediately without any further processing. However, after receiving the electromagnetic signal as the first FDM signal the second network node 112 may perform various processing of the electromagnetic signal before transmitting it to the first network node 111 in action 305 below. This is illustrated in FIG. 6.

The second network node 112 may for example further de-multiplex the first FDM signal into signals corresponding to the sub-carriers or sub-bands. In other words, the electrical signal may be mixed another time with a sub-carrier specific frequency to extract the actual test signal.

Alternatively, a signal at specific IF frequency may be extracted by means of filtering and looped-back. This would allow to bypass any mixing stage.

Other signal processing may for example comprise splitting and/or amplifying and/or adjusting the phase of the electromagnetic signal. Amplification, which may be performed by an amplifier 610, may be advantageous when there is a need to compensate for losses, e.g. losses from the transmission or from other signal processing steps, such as splitting.

Figure 7:
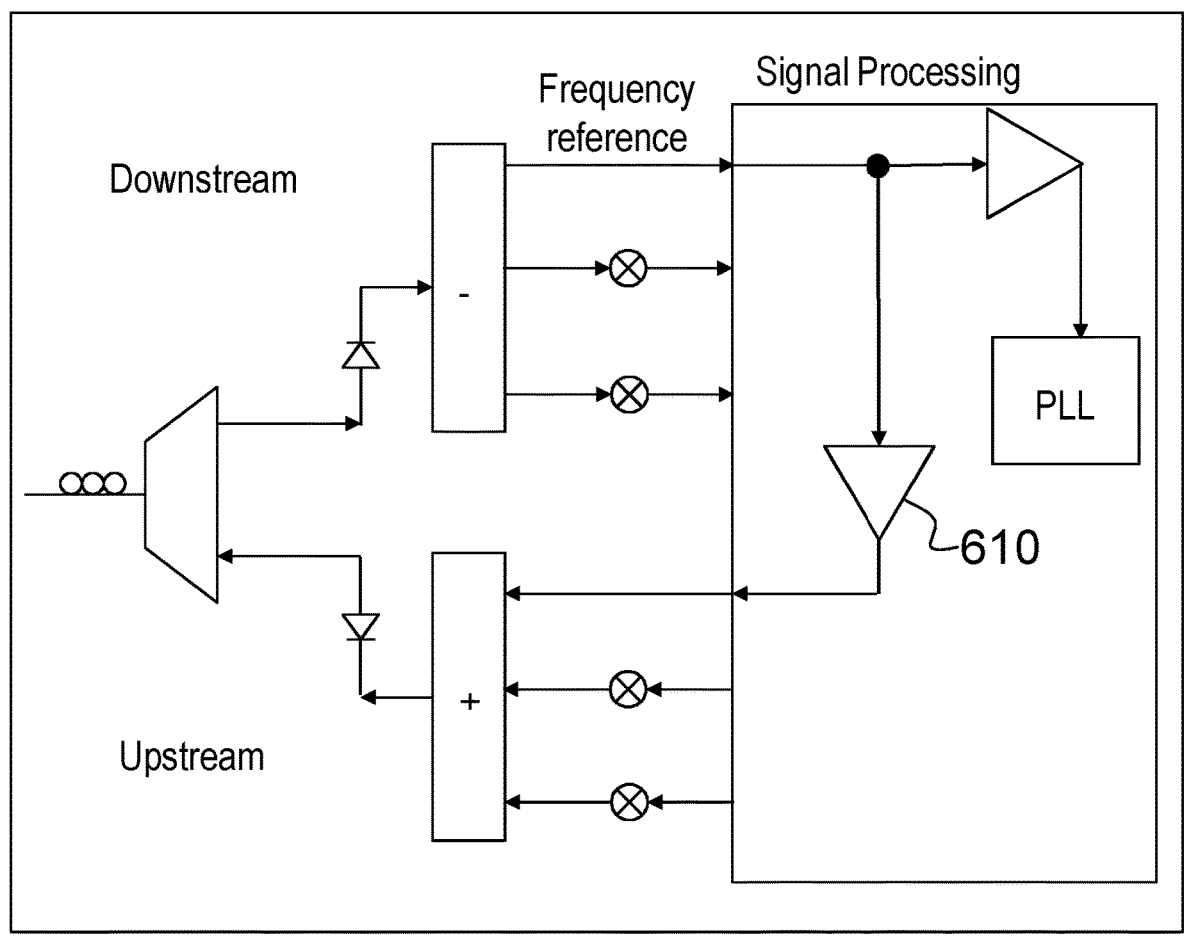
FIG. 7 is a combined flowchart and block diagram depicting further embodiments of a second network node and a method in a second network node.

FIG. 7 illustrates some embodiments wherein the frequency reference signal is the electromagnetic signal used for determining the latency. Then the frequency reference signal may be extracted from the FDM signal via e.g. band-pass filtering. After splitting-off a small amount of the frequency reference signal and optionally amplifying it, for example with the amplifier 610, and/or adjusting the phase of it, the frequency reference signal may be combined with the other up-stream signals and transmitted back to the first network node 111.

This action is related to action 1302 below.

Action 305

After optional processing by for example means of amplification, the signal may be mixed on to an electrical IF frequency in the same way as when received and transmitted back to the first network node 111.

The second network node 112 then transmits the electromagnetic signal to the first network node 111 over the transmission link 120 as a second FDM signal comprised in a second electromagnetic carrier also comprising payload data. This enables the first network node 111 to determine the latency of the transmission link 120 in action 306 below.

The second network node 112 may transmit the electromagnetic signal by using a modulation device 275, which is the same modulation device 275 as for the payload data. The modulation device 275 may for example be the second modulation device 275 in FIG. 2.

If the transmission link 130 is an electrical transmission link, e.g. comprising a copper cable, the electromagnetic signal may be transmitted without using the modulation device 275. In such a case the electromagnetic signal may be amplified before being transmitted, e.g. by a line-driver.

At the other end of the transmission link the first network node 111 receives the electromagnetic signal from the second network node 112 over the transmission link 120. The first network node 111 may de-multiplex the second FDM signal into signals corresponding to the sub-carriers or sub-bands.

This action is related to actions 1102 and 1303 below.

Action 306

The first network node 111 then determines the latency of the transmission link 120 based on a phase difference between the transmitted electromagnetic signal and the received electromagnetic signal.

In some embodiments the first network node 111 determines the latency of the transmission link 120 by comparing a phase of the transmitted electromagnetic signal with a phase of the received electromagnetic signal.

This action is related to action 1103 below.

Figure 8:
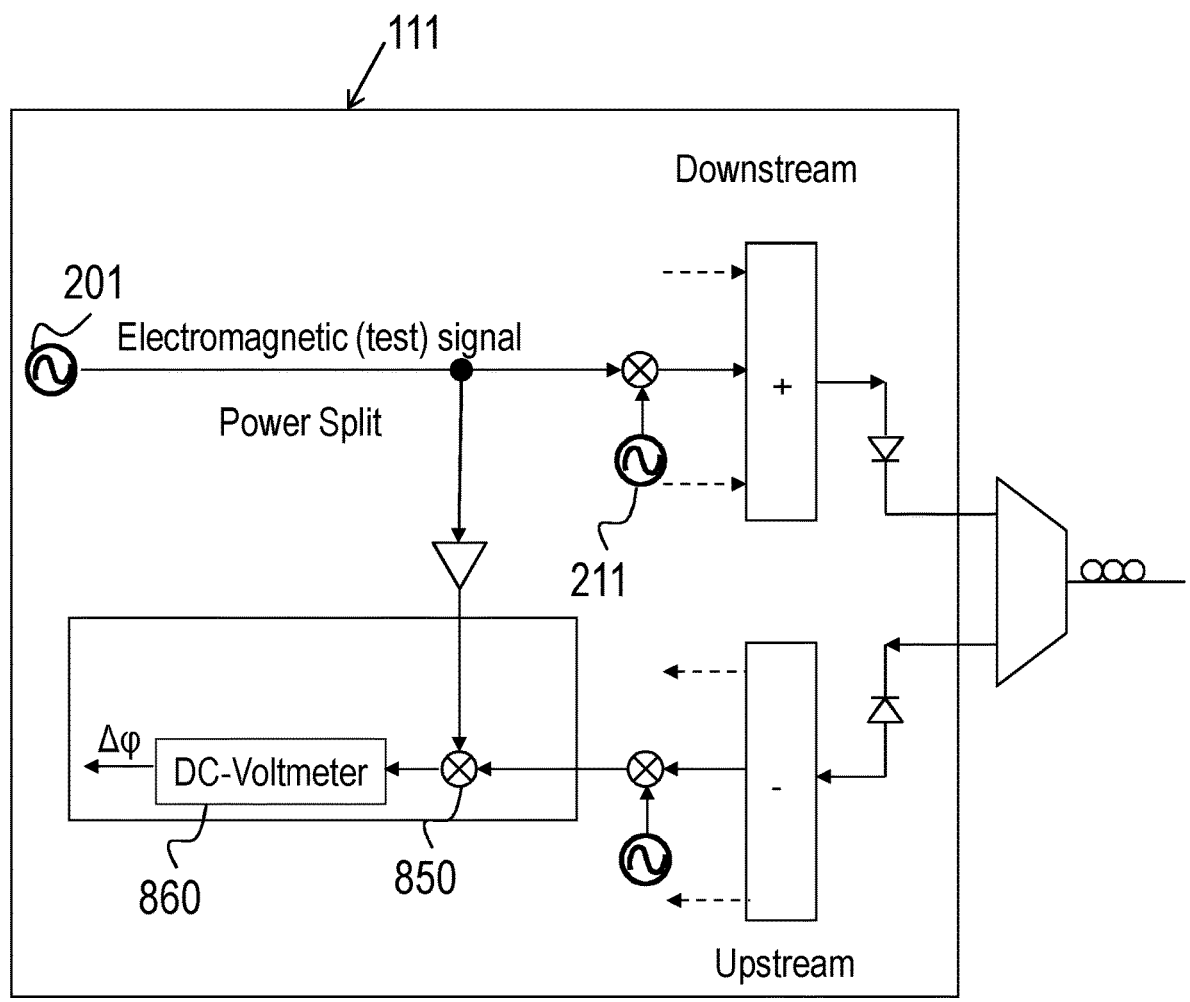
FIG. 8 is a combined flowchart and block diagram depicting further embodiments of a first network node and a method in a first network node.

Some specific embodiments of a method in the first network node 111 and of the first network node 111 will now be illustrated with reference to FIG. 8. An electromagnetic signal of zero, i.e. DC, or of moderate frequency is generated, e.g. by the first payload generator 201. The electromagnetic signal may be periodic, e.g. a sinus signal. After tapping-off a fraction of the electromagnetic signal the remaining part of the electromagnetic signal may be modulated onto a sub-carrier signal, e.g. by the first sub-carrier generator 211 before it is transmitted to the second network node 112 over the transmission link 120. After the second network node 112 has received the electromagnetic signal the second network node 112 transmits the electromagnetic signal back to the first network node 111 over the transmission link 120, 820. In other words, after looping-back at the remote site, as described before, the electromagnetic signal is received by the first network node 111. The received electromagnetic signal may be demodulated with a sub-carrier signal of the same frequency, e.g. at 200 MHz, as used for modulation onto the sub-carrier. After the optional demodulation the received electromagnetic signal and the fraction of the electromagnetic signal that was tapped off before transmission are mixed, e.g. in a mixer 850. Since the two parts of the electromagnetic signal may be assumed to have the same frequency, the mixing result at DC frequency is related to the phase-shift between the two parts of the electromagnetic signal and thus to the delay between the two parts of the electromagnetic signal. Thus the resulting phase shift information may be extracted from a DC-voltmeter 860, which may be comprised in the first network node 111. The latency of the transmission link 120 may be calculated as half the round-trip time of the transmission link 120.

Figure 9:
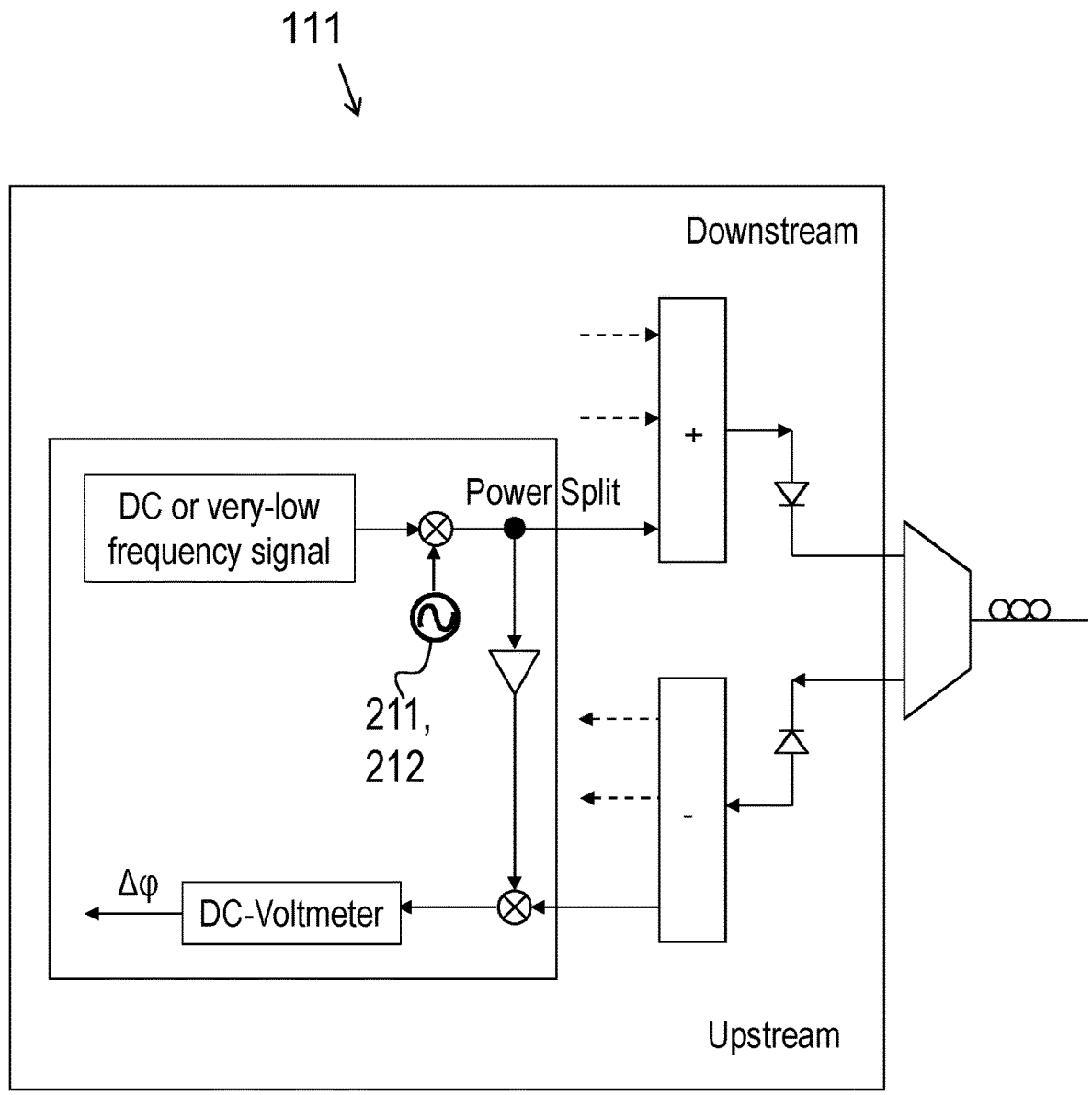
FIG. 9 is a combined flowchart and block diagram depicting further embodiments of a first network node and a method in a first network node.

Some other specific embodiments of a method in the first network node 111 and of the first network node 111 are illustrated in FIG. 9. In these embodiments the electromagnetic signal used to determine the latency of the transmission link 120 is generated by mixing, e.g. up-mixing to IF-frequency, the signal from the first payload generator 201 with the signal from the first sub-carrier generator 211. An advantage with this is that less system complexity is required in the first network node 111 as no down-mixing of the electromagnetic signal received in upstream in the first network node 111 is needed. For example a gain stage might be skipped due to this.

Figure 10:
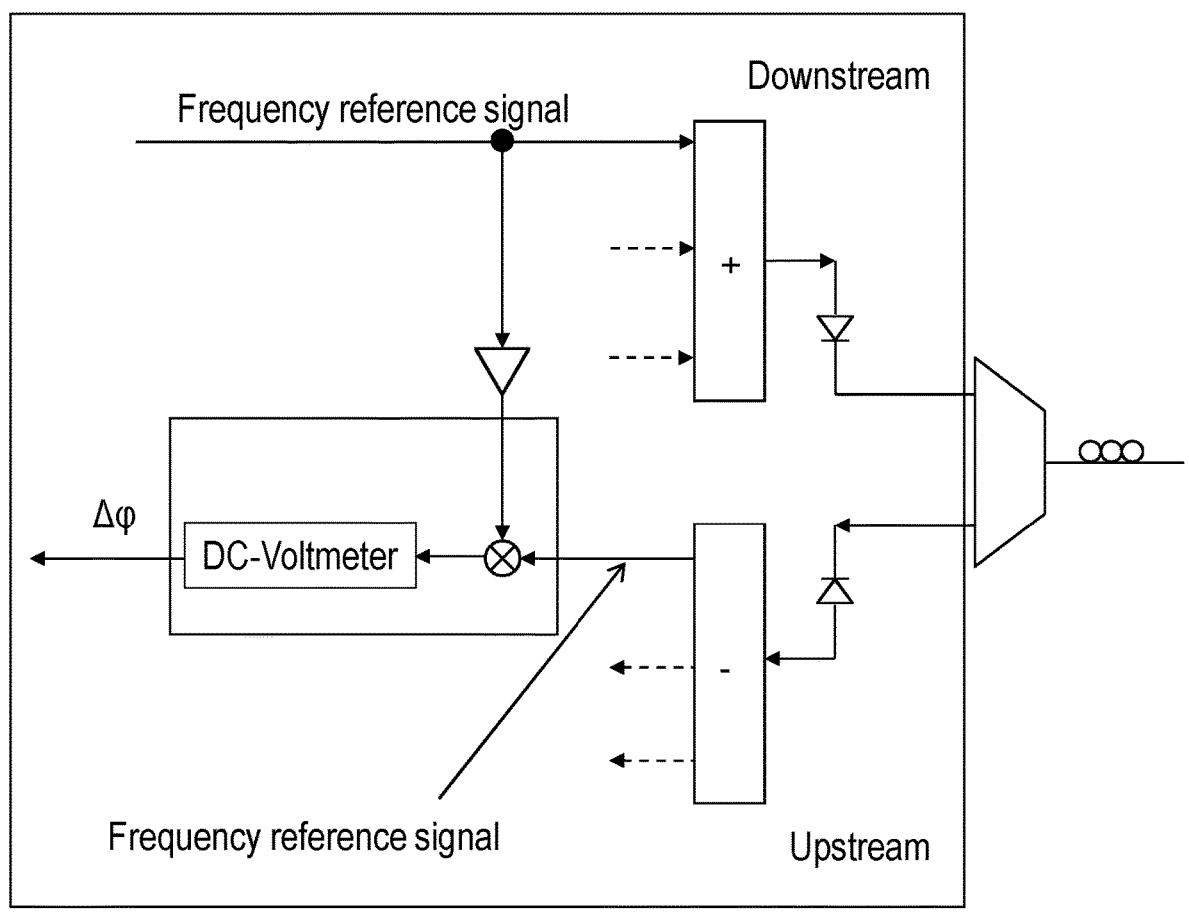
FIG. 10 is a combined flowchart and block diagram depicting further embodiments of a first network node and a method in a first network node.

Some additional embodiments of a method in the first network node 111 and of the first network node 111 are illustrated in FIG. 10. In these embodiments, the frequency reference signal as provided from the first network node 111, e.g. the RU, to the second network node 112, e.g. the remote site, is also used as test-signal for determining the latency of the transmission link 120. An advantage with this is that sub-carriers that may be used for RF-signal transmission of payload may be available also during latency measurements. Such a method may be used for continuous tracking and/or updating of latency changes.

The generation of the electromagnetic signal, i.e. the test signal, may be performed as an integrated part of a phase-shift measurement module or phase comparison module in the first network node 111 and based on a dedicated sub-carrier. Such dedicated sub-carrier may be chosen according to suitability for RF-signal transmission. The dedicated sub-carrier may also be one that has low SNR, e.g. for reasons of design or component properties, and is not suitable for fronthaul, but still good enough for latency measurements.

Determination of Round-Trip Time

In the following, the algorithm to calculate round-trip time from phase-difference measurements is shortly explained. The intention is to explain why a simple phase measurement with only one frequency may be insufficient and the advantage of using a combination of test-signals over sub-carriers and the frequency reference signal. Such combination of test signals may provide means for latency measurements in a nano-second scale over transmission link lengths of several kilometers, which is usually not possible over low bandwidth, low power payload channels and without additional dedicated measurement equipment.

Let $\Delta t$ be the round-trip time in the transmission link 120 for a periodic, e.g. a sinusoidal, electromagnetic signal of frequency $f=1/T$, where T is the period of the signal. That is, if the length of transmission link 120 is L, then $2L=\Delta t \cdot c_0$ where $c_0$ is the signal speed. The signal speed in optical fiber may be assumed to be about $2^8$ m/s, resulting in $\Delta t = 10$ μs per kilometer of fiber. If $$\Delta t < T \quad (1)$$

then the round-trip time and the measured phase-difference $\Delta\varphi$ are related by $$\Delta t = T \cdot \frac{\Delta\varphi}{2\pi} \quad (2)$$

and is thus unambiguous. If $$\Delta t > T \quad (3)$$

The general relation between $\Delta t$, T and $\Delta\varphi$ is $$\Delta t = K \cdot T + T \cdot \frac{\Delta\varphi}{2\pi} \quad (4)$$

with K being an unknown multiple, as $\Delta\varphi$ can only be measured modulo $2\pi$. However, having a sufficiently good guess on $\Delta t$ allows to determine K as $$K = \left\lfloor \frac{\Delta t}{T} \right\rfloor \quad (5)$$

From equation (2) and (4) it is visible that any measurement error $\delta\varphi$ in the phase-difference results in an estimation error $\delta t$ of $\Delta t$ of $$\delta t = T \cdot \frac{\delta\varphi}{2\pi} \quad (6)$$

It is therefore desirable to have T large, so that (1) is fulfilled and (2) may be used for a direct determination of $\Delta t$. On the other hand T should be small, i.e. the test-signal frequency should be high in order to keep estimation errors small according to equation (6). This will relax the requirements on the measurement error of the phase difference as seen from equation (6) and thus the required measurement system complexity is lowered.

A solution may be to use test-signals of different frequencies and refine the estimation of round-trip time iteratively. In a first step, starting with a very low frequency test-signal ensures that equation (1) is fulfilled and gives a rough estimate of the round-trip time according to equation (2). Such low frequency test signal may be transmitted over the sub-carriers. In a second step, using a signal of increased frequency results in ambiguity of the round-trip time according to equation (4). However, the round-trip time may be determined by using equation (5) and using a rough estimate of the round-trip time, $\Delta t$, obtained from using the low frequency signal in the step before. Such increased frequency test-signal may also be transmitted over a sub-carrier. Increasing the test-signal frequency more and more allow for further refinements in the estimation of the round-trip time, $\Delta t$, as the estimation error goes down according to equation (6).

With an estimation error of phase-differences of 10% and a test signal frequency of 100 MHz, the estimation error may be assumed to be about 1 ns. 100 MHz is a reasonable frequency reference signal frequency in an SCM based fronthaul link as described above. If an unmodulated sub-carrier is used as test-signal, frequencies of 500 MHz up to 2-3 GHz may easily be obtained which leads to estimation errors of 50-200 ps. The effective absolute estimation error is independent of the actual absolute round-trip time. Thus, it is also possible to measure round-trip times and link latency down to fractions of ns.

Figure 11:
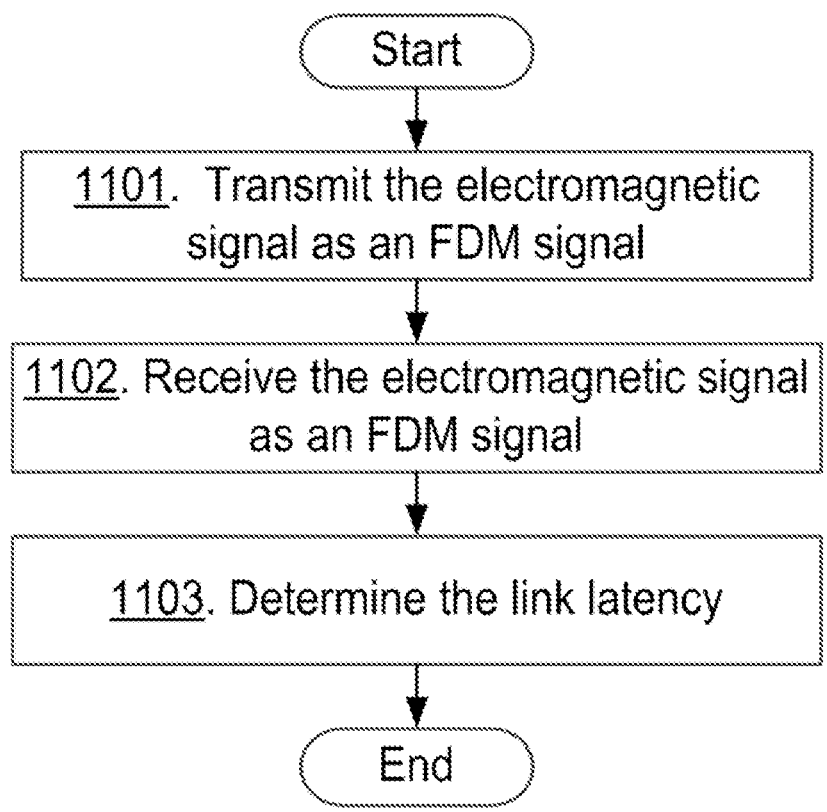
FIG. 11 is a flowchart depicting embodiments of a method in a first network node.

A method will now be described from a perspective of the first network node 111. Thus, embodiments of a method in the first network node 111 for determining the latency of the transmission link 120 between the first network node 111 and the second network node 112 in the communications network 100, will be described with reference to a flowchart depicted in FIG. 11. As mentioned above the FDM signals may be SCM signals and the actions of transmitting and receiving the electromagnetic signal over the transmission link 120 may be performed using an SCM based transmission system.

The method comprises the following actions, which actions may be taken in any suitable order.

Action 1101

The first network node 111 transmits the electromagnetic signal to the second network node 112 over the transmission link 120 as the first FDM signal comprised in the first electromagnetic carrier also comprising payload data.

In some embodiments the first network node 111 transmits the electromagnetic signal by using the modulation device 220, which is the same modulation device 220 as for the payload data. By using the same modulation device 220 the cost of the first network node 111 is further reduced.

The electromagnetic signal may be any one or more of: the frequency reference signal, the unmodulated sub-carrier or sub-band, the modulated sub-carrier or sub-band and the modulation signal of the sub-carrier or sub-band. The advantages of the different signals for use as the electromagnetic signal, i.e. test signal, has been outlined above.

This action is related to action 303 above.

Action 1102

After the first network node 111 has transmitted the electromagnetic signal and the second network node 112 has received and transmitted the signal back to the first network node 111, the first network node 111 receives the electromagnetic signal from the second network node 112 over the transmission link 120. The electromagnetic signal has been transmitted from the second network node 112 as the second FDM signal comprised in the second electromagnetic carrier also comprising payload data.

This action is related to action 305 above.

Action 1103

When the first network node 111 has received the electromagnetic signal, the first network node 111 determines the latency of the transmission link 120 based on the phase difference between the transmitted electromagnetic signal and the received electromagnetic signal.

In some embodiments the determining of the latency of the transmission link 120 comprises comparing the phase of the transmitted electromagnetic signal with the phase of the received electromagnetic signal. Details of how to determine the latency of the transmission link 120 from the phase difference has been outlined above.

By using the first FDM signal to transmit the electromagnetic signal the transmission link 120 doesn't need to be exclusively available for the determination of the latency of the transmission link 120. The determination may be carried out while some of the payload data is transmitted between the first network node 111 and the second network node 112. In this way the performance of the first network node 111, the second network node 112 and the communications network 100 is improved.

By using the first FDM signal to transmit the electromagnetic signal over the transmission link 120 the cost for measuring the latency of the transmission link 120 is reduced since low bandwidth components may be used for the first network node 111, the second network node 112 and the transmission link 120. By using the first electromagnetic carrier also comprising payload data the cost and complexity of the determination is further reduced since the same equipment may be used for transmitting and receiving the electromagnetic signal serving as the test signal as for transmitting and receiving the payload and the reference signal which in any case will be present.

This action is related to action 306 above.

Figure 12:
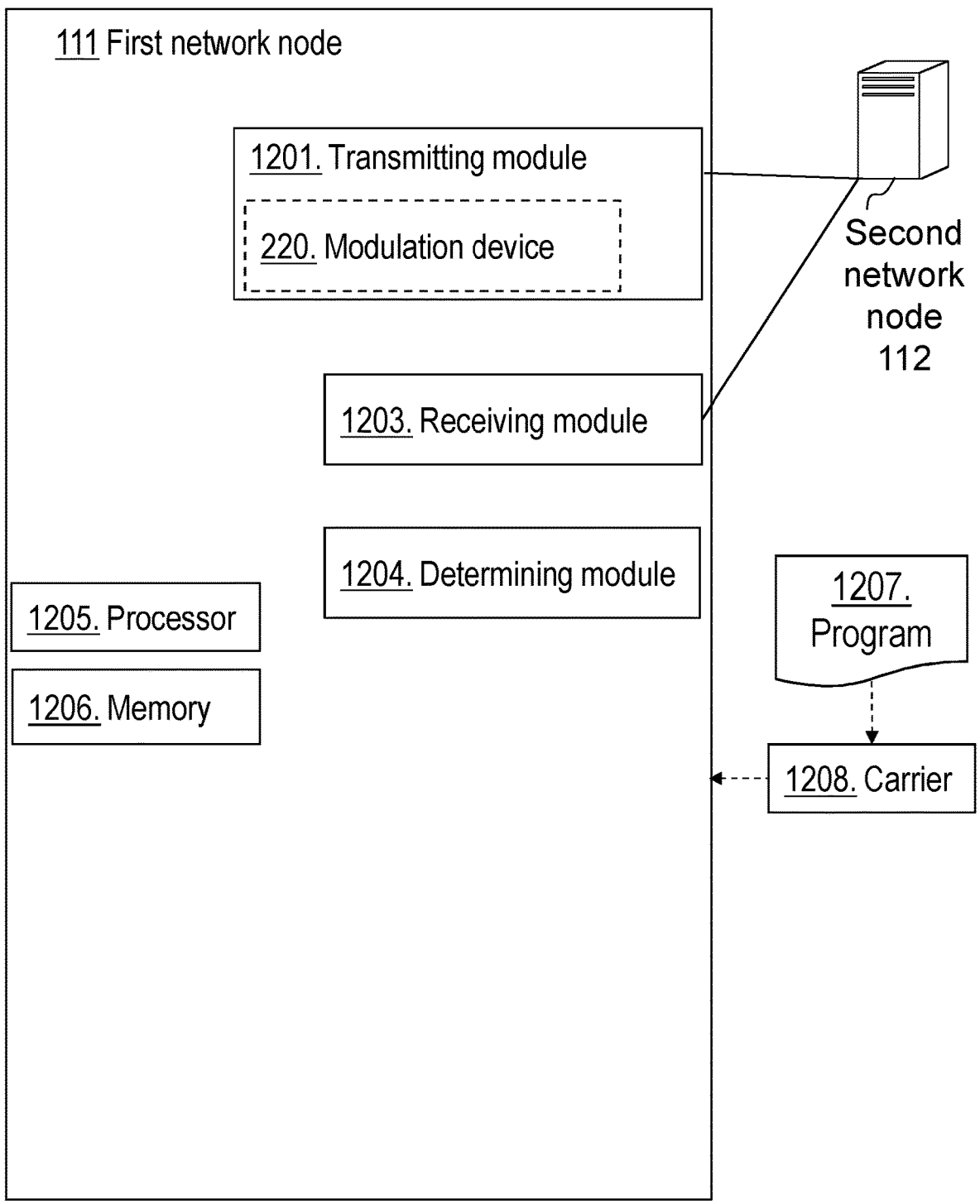
FIG. 12 is a schematic block diagram illustrating embodiments of a first network node.

To perform the method actions for determining the latency of the transmission link 120 between the first network node 111 and the second network node 112 in the communications network 100 described above in relation to FIG. 11, the first network node 111 may comprise the following arrangement depicted in FIG. 12. The first network node 111 is adapted to determine the latency of the transmission link 120 between the first network node 111 and the second network node 112 in the communications network 100.

As mentioned above the FDM signals may be SCM signals and the first network node 111 may be further adapted to transmit and receive the electromagnetic signal using an SCM based transmission system.

In some embodiments the electromagnetic signal is any one or more of: the frequency reference signal, the unmodulated sub-carrier or sub-band, the modulated sub-carrier or sub-band and the modulation signal of the sub-carrier or sub-band.

The first network node 111 is adapted to, e.g. by means of a transmitting module 1201 adapted to, transmit the electromagnetic signal to the second network node 112 over the transmission link 120 as the first FDM signal comprised in the first electromagnetic carrier also comprising payload data.

In some embodiments the first network node 111 is further adapted to, e.g. by means of the transmitting module 1201 adapted to, transmit the electromagnetic signal using the modulation device 220, which is the same modulation device 220 as for the payload data.

The transmitting module 1201 may be a transmitter in the first network node 111.

The first network node 111 is further adapted to, e.g. by means of a receiving module 1203 adapted to, receive the electromagnetic signal from the second network node 112 over the transmission link 120, wherein the electromagnetic signal has been transmitted from the second network node 112 as the second FDM signal comprised in the second electromagnetic carrier also comprising payload data.

The receiving module may be a receiver in the first network node 111.

The first network node 111 is further adapted to, e.g. by means of a determining module 1204 adapted to, determine the latency of the transmission link 120 based on the phase difference between the transmitted electromagnetic signal and the received electromagnetic signal.

In some embodiments the first network node 111 is further adapted, e.g. by means of the determining module 1204 being adapted, to determine the latency by comparing the phase of the transmitted electromagnetic signal with the phase of the received electromagnetic signal.

The determining module 1204 may be a processor 1205 of the first network node 111.

The embodiments herein for determining the latency of the transmission link 120 between the first network node 111 and the second network node 112 in the communications network 100 may be implemented through one or more processors, such as the processor 1205 in the first network node 111 depicted in FIG. 12, together with instructions, such as computer program code, for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1206 comprising one or more memory units. The memory 1206 is arranged to be used to store e.g. phase differences, frequencies, periods, information and data relating to the reference signal, calibration data, old measurement results, parameters, configurations, applications and computer program code to perform the methods herein when being executed in the first network node 111. The computer program code that is executable by the processor 1205 may be in the form of a computer program 1207. The computer program 1207 may be contained in or by a carrier 1208, which may provide the computer program 1207 to the memory 1206 and processor 1205. The carrier 1208 may be in any suitable form including an electronic signal, an optical signal, a radio signal or a computer readable storage medium.

Those skilled in the art will also appreciate that the transmitting module 1201, receiving module 1203 and transmitting module 1204 described above may refer to a combination of analog and digital circuits, and/or one or more processors configured with software and/or firmware, e.g. stored in a memory, that when executed by the one or more processors such as the processor 1205 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 13:
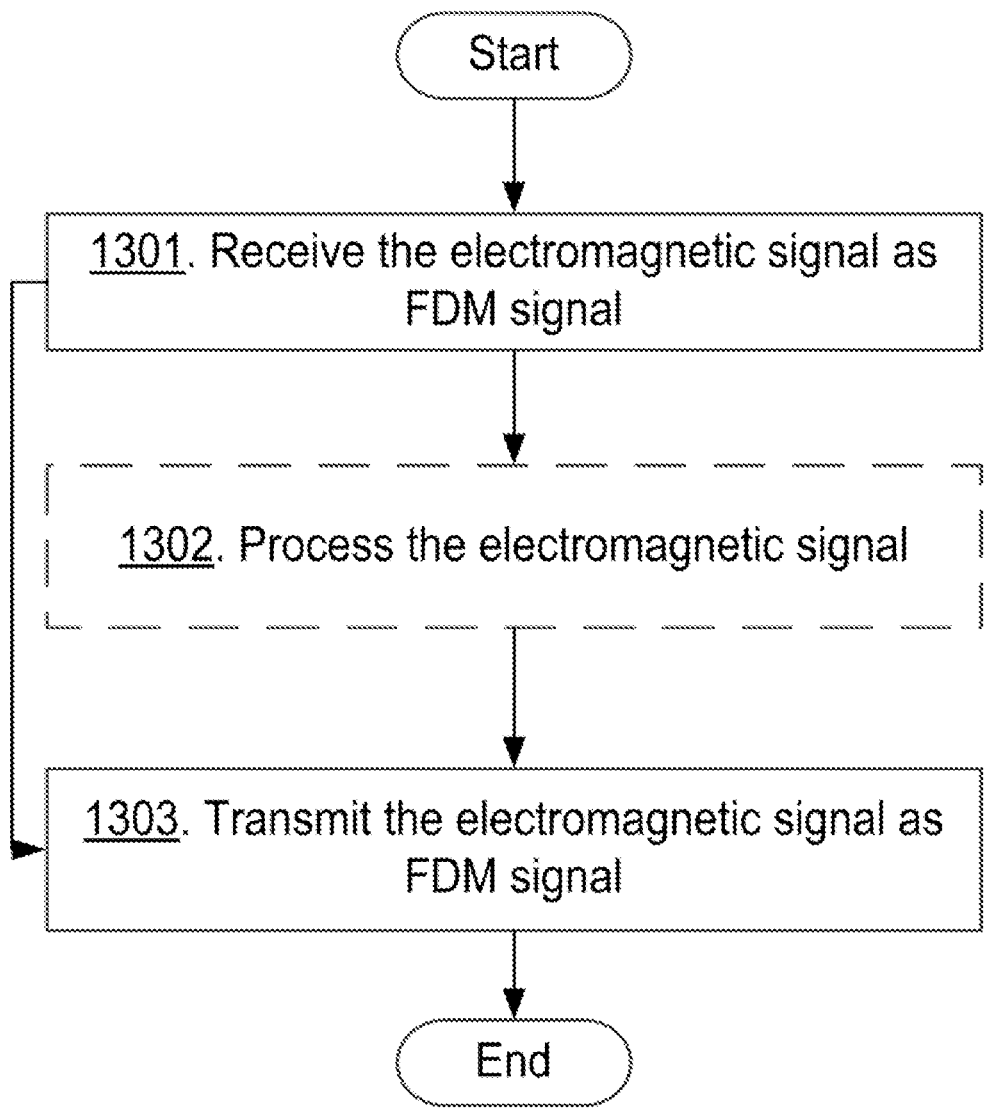
FIG. 13 is a flowchart depicting embodiments of a method in a second network node.

A method will now be described from a perspective of the second network node 112. Thus, embodiments of a method in the second network node 112 for enabling the determining of the latency of the transmission link 120 between a first network node 111 and the second network node 112 in a communications network 100, will now be described with reference to a flowchart depicted in FIG. 13. As mentioned above, the FDM signals described below may be SCM signals and the actions of transmitting and receiving the electromagnetic signal over the transmission link 120 may be performed using an SCM based transmission system.

As further mentioned above, the electromagnetic signal may be any one or more of: the frequency reference signal, the unmodulated sub-carrier or sub-band, the modulated sub-carrier or sub-band and the modulation signal of the sub-carrier or sub-band.

The method comprises the following actions, which actions may be taken in any suitable order.

Action 1301

The second network node 112 receives from the first network node 111 an electromagnetic signal over the transmission link 120 as the first Frequency-Division Multiplexed, FDM, signal comprised in the first electromagnetic carrier also comprising payload data.

This action is related to action 303 above.

Action 1302

In some embodiments the second network node 112 processes the electromagnetic signal before the second network node 112 transmits it to the first network node 111. The second network node 112 may for example split and/or amplify the electromagnetic signal.

This action is related to action 304 above.

Action 1303

The second network node 112 transmits the electromagnetic signal to the first network node 111 over the transmission link 120 as the second FDM signal comprised in the second electromagnetic carrier also comprising payload data. This enables the first network node 111 to determine the latency of the transmission link 120 based on the phase difference between the electromagnetic signal as transmitted from the first network node 111 and the electromagnetic signal as received by the first network node 111 after transmission from the second network node 112.

The second network node 112 may transmit the electromagnetic signal by using a modulation device 275, which is the same modulation device 275, as for the payload data. The modulation device 275, may for example be the second modulation device 275 in FIG. 2.

This action is related to action 305 above.

Figure 14:
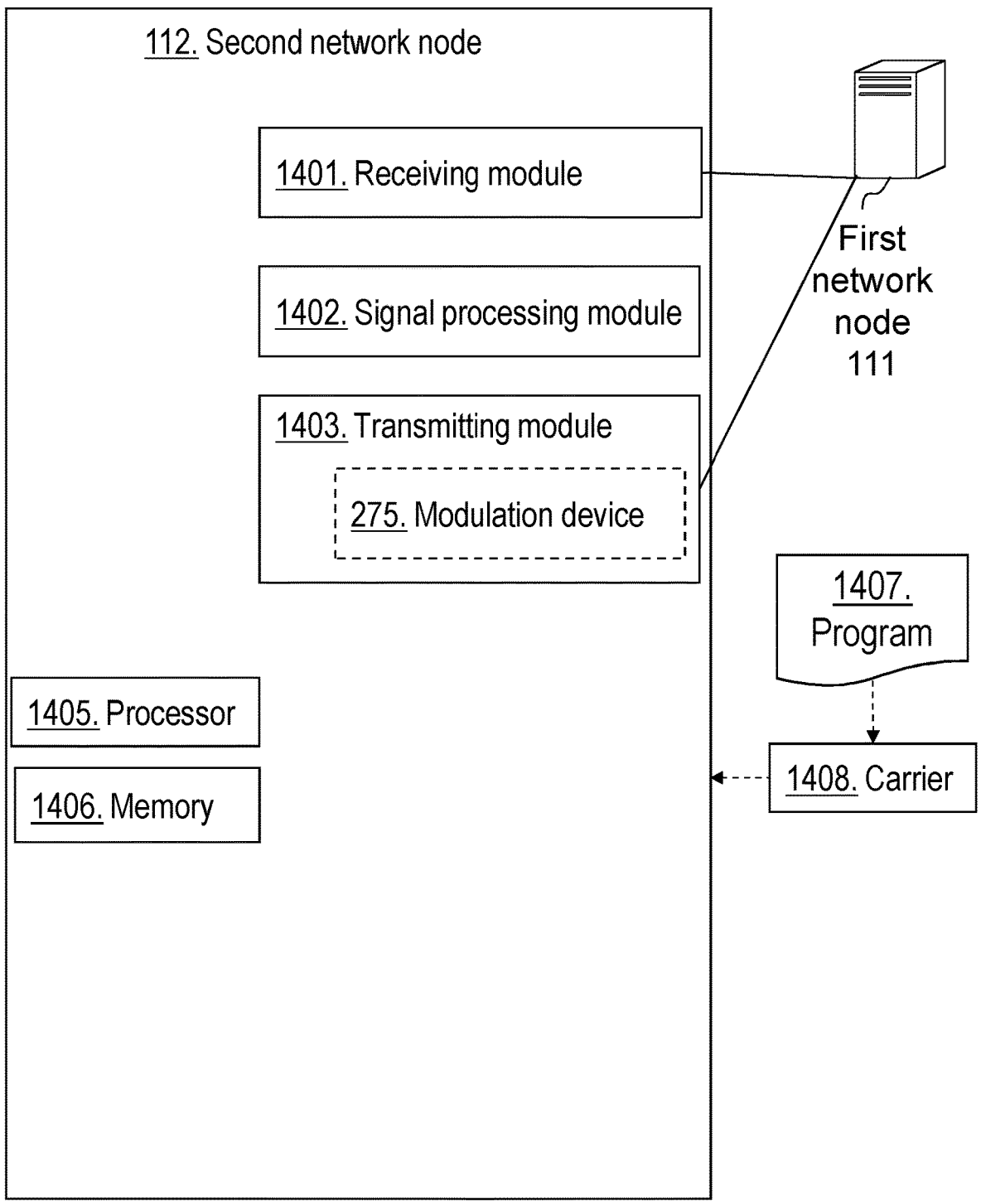
FIG. 14 is a schematic block diagram illustrating embodiments of a second network node.

To perform the method actions for enabling the determining of the latency of the transmission link 120 between the first network node 111 and the second network node 112 in the communications network 100 described above in relation to FIG. 13, the second network node 112 may comprises the following arrangement depicted in FIG. 14. The second network node 112 is adapted to enable the determining of the latency of the transmission link 120 between the first network node 111 and the second network node 112 in the communications network 100. As mentioned above the FDM signals may be SCM signals and the second network node 112 may be further adapted to transmit and receive the electromagnetic signal using an SCM based transmission system.

In some embodiments the electromagnetic signal is any one or more of: the frequency reference signal, the unmodulated sub-carrier or sub-band, the modulated sub-carrier or sub-band and the modulation signal of the sub-carrier or sub-band.

The second network node 112 is adapted to, e.g. by means of a receiving module 1401 adapted to, receive from the first network node 111 an electromagnetic signal over the transmission link 120 as the first FDM signal comprised in the first electromagnetic carrier also comprising payload data.

The receiving module 1401 may be a receiver in the second network node 112.

In some embodiments the second network node 112 is further adapted, e.g. by means of a processing module 1402 being adapted, to process the electromagnetic signal before transmitting it to the first network node 111. For example the processing module 1402 may be adapted to split and/or amplify the electromagnetic signal.

The processing module 1402 may for example be the amplifier 610, a phase shifter or a power splitter in the second network node 112.

The second network node 112 is further adapted, e.g. by means of a transmitting module 1403 being adapted, to transmit the electromagnetic signal to the first network node 111 over the transmission link 120 as the second FDM signal comprised in the second electromagnetic carrier also comprising payload data, enabling the first network node 111 to determine the latency of the transmission link 120 based on the phase difference between the electromagnetic signal as transmitted from the first network node 111 and the electromagnetic signal as received by the first network node 111 after transmission from the second network node 112.

In some embodiments the second network node 112 is further adapted to, e.g. by means of the transmitting module 1403 being further adapted to, transmit the electromagnetic signal by using the modulation device 275, which is the same modulation device 275 as for the payload data. The modulation device 275 may for example be the second modulation device 275 in FIG. 2.

The embodiments herein for enabling the determining of the latency of the transmission link 120 between the first network node 111 and the second network node 112 in the communications network 100 may be implemented through one or more processors, such as a processor 1405 in the second network node 112 depicted in FIG. 14, together with instructions, such as computer program code, for performing the functions and actions of the embodiments herein. The program code mentioned above may also be provided as a computer program product, for instance in the form of a data carrier carrying computer program code for performing the embodiments herein when being loaded into the in the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1406 comprising one or more memory units. The memory 1406 is arranged to be used to store information about changes to the electromagnetic signal in the second network node 112, signal processing parameters such as phase and amplitude compensation, frequencies, periods, calibration data, old measurement results, parameters, configurations, applications and computer program code to perform the methods herein when being executed in the second network node 112. The computer program code that is executable by the processor 1405 may be in the form of a computer program 1407. The computer program 1407 may be contained in or by a carrier 1408, which may provide the computer program 1407 to the memory 1406 and processor 1405. The carrier 1408 may be in any suitable form including an electronic signal, an optical signal, a radio signal or a computer readable storage medium.

Those skilled in the art will also appreciate that the receiving module 1401, signal processing module 1402 and transmitting module 1403 described above may refer to a combination of analog and digital circuits, and/or one or more processors configured with software and/or firmware, e.g. stored in a memory, that when executed by the one or more processors such as the processor 1405 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

The invention claimed is:

1. A method in a first network node for determining a latency of a transmission link between the first network node and a second network node in a communications network, the method comprising:

transmitting an electromagnetic test signal to the second network node over the transmission link as a first Frequency-Division Multiplexed (FDM) signal comprised in a first electromagnetic carrier also comprising payload data, wherein the electromagnetic test signal is modulated on to a sub-carrier of the first electromagnetic carrier and wherein the electromagnetic test signal is partially split and a split portion retained at the first network node prior to transmitting to the second network node;

receiving the electromagnetic test signal from the second network node over the transmission link, in response to the second network node receiving the electromagnetic test signal, wherein the electromagnetic test signal has been transmitted from the second network node as a second FDM signal comprised in a second electromagnetic carrier also comprising payload data, wherein the first FDM signal and the second FDM signal are Sub-Carrier Multiplexed (SCM) signals, and wherein transmitting and receiving the electromagnetic test signal over the transmission link is performed using an SCM-based transmission system; and determining the latency of the transmission link based on a phase difference between the split portion of the electromagnetic test signal and the electromagnetic test signal received from the second network node.

2. The method according to claim 1, wherein the transmitting of the electromagnetic test signal is performed by using a modulation device, which is the same modulation device as for the payload data.

3. The method according to claim 1, wherein the determining of the latency of the transmission link comprises comparing a phase of the split portion of the electromagnetic test signal with a phase of the received electromagnetic test signal.

4. The method according to claim 1, wherein the transmission link between the first node and the second node is a fronthaul transmission link of the communications network, and wherein the electromagnetic test signal received from the second network node is amplified by an amplifier at the second network node.

5. A first network node adapted to determine a latency of a transmission link between the first network node and a second network node in a communications network, the first network node being adapted to:

transmit an electromagnetic test signal to the second network node over the transmission link as a first Frequency-Division Multiplexed (FDM) signal comprised in a first electromagnetic carrier also comprising payload data, wherein the electromagnetic test signal is modulated on to a sub-carrier of the first electromagnetic carrier and wherein the electromagnetic test signal is partially split and a split portion retained at the first network node prior to transmitting to the second network node;

receive the electromagnetic test signal from the second network node over the transmission link, in response to the second network node receiving the electromagnetic test signal, wherein the electromagnetic test signal has been transmitted from the second network node as a second FDM signal comprised in a second electromagnetic carrier also comprising payload data, wherein the first FDM signal and the second FDM signal are Sub-Carrier Multiplexed (SCM) signals, and wherein transmitting and receiving the electromagnetic test signal over the transmission link is performed using an SCM-based transmission system; and determine the latency of the transmission link based on a phase difference between the split portion of the electromagnetic test signal and the electromagnetic test signal received from the second network node.

6. The first network node according to claim 5, wherein the first network node is further adapted to transmit the electromagnetic test signal using a modulation device, which is the same modulation device as for the payload data.

7. The first network node according to claim 5, wherein the first network node is further adapted to determine the latency by comparing a phase of the split portion of the electromagnetic test signal with a phase of the received electromagnetic test signal.

8. The first network node according to claim 5, wherein the transmission link between the first node and the second node is a fronthaul transmission link of the communications network, and wherein the electromagnetic test signal received from the second network node is amplified by an amplifier at the second network node.

9. A method in a second network node for enabling to determine a latency of a transmission link between a first network node and the second network node in a communications network, the method comprising:

receiving from the first network node an electromagnetic test signal over the transmission link as a first Frequency-Division Multiplexed (FDM) signal comprised in a first electromagnetic carrier also comprising payload data, wherein the electromagnetic test signal is modulated on to a sub-carrier of the first electromagnetic carrier at the first network node and wherein the electromagnetic test signal is partially split and a split portion retained at the first network node prior to transmitting from the first network node to the second network node; and transmitting the electromagnetic test signal to the first network node over the transmission link, in response to receiving the electromagnetic test signal from the first network node, as a second FDM signal comprised in a second electromagnetic carrier also comprising payload data, in order to enable the first network node to determine the latency of the transmission link based on a phase difference between the split portion of the electromagnetic test signal retained at the first network node and the electromagnetic test signal received at the first network node after transmission from the second network node, wherein the first FDM signal and the second FDM signal are Sub-Carrier Multiplexed (SCM) signals, and wherein transmitting and receiving the electromagnetic test signal over the transmission link is performed using an SCM-based transmission system.

10. The method according to claim 9, wherein the transmitting of the electromagnetic test signal is performed by using a modulation device, which is the same modulation device as for the payload data.

11. The method according to claim 9, further comprising processing the electromagnetic test signal before transmitting it to the first network node.

12. The method according to claim 9, wherein the transmission link between the first node and the second node is a fronthaul transmission link of the communications network, and wherein the electromagnetic test signal received from the second network node is amplified by an amplifier at the second network node.

13. A second network node adapted to enable determination of a latency of a transmission link between a first network node and the second network node in a communications network, the second network node being adapted to:

receive from the first network node an electromagnetic test signal over the transmission link as a first Frequency-Division Multiplexed (FDM) signal comprised in a first electromagnetic carrier also comprising payload data, wherein the electromagnetic test signal is modulated on to a sub-carrier of the first electromagnetic carrier at the first network node and wherein the electromagnetic test signal is partially split and a split portion retained at the first network node prior to transmitting from the first network node to the second network node; and transmit the electromagnetic test signal to the first network node over the transmission link, in response to receiving the electromagnetic test signal from the first network node, as a second FDM signal comprised in a second electromagnetic carrier also comprising payload data, in order to enable the first network node to determine the latency of the transmission link based on a phase difference between the split portion of the electromagnetic test signal retained at the first network node and the electromagnetic test signal received at the first network node after transmission from the second network node, wherein the first FDM signal and the second FDM signal are Sub-Carrier Multiplexed (SCM) signals, and wherein transmitting and receiving the electromagnetic test signal over the transmission link is performed using an SCM-based transmission system.

14. The second network node according to claim 13, further adapted to transmit the electromagnetic test signal by using a modulation device, which is the same modulation device as for the payload data.

15. The second network node according to claim 13, further being adapted to process the electromagnetic test signal before transmitting it to the first network node.

16. The second network node according to claim 13, wherein the transmission link between the first node and the second node is a fronthaul transmission link of the communications network, and wherein the electromagnetic test signal received from the second network node is amplified by an amplifier at the second network node.

17. A non-transitory computer-readable storage medium storing instructions which, when executed on at least one processor in a first network node, cause the first network node to perform operations comprising:

transmitting an electromagnetic test signal to a second network node over a transmission link as a first Frequency-Division Multiplexed (FDM) signal comprised in a first electromagnetic carrier also comprising payload data, wherein the electromagnetic test signal is modulated on to a sub-carrier of the first electromagnetic carrier and wherein the electromagnetic test signal is partially split and a split portion retained at the first network node prior to transmitting to the second network node;

receiving the electromagnetic test signal from the second network node over the transmission link, in response to the second network node receiving the electromagnetic test signal, wherein the electromagnetic test signal has been transmitted from the second network node as a second FDM signal comprised in a second electromagnetic carrier also comprising payload data, wherein the first FDM signal and the second FDM signal are Sub-Carrier Multiplexed (SCM) signals, and wherein transmitting and receiving the electromagnetic test signal over the transmission link is performed using an SCM-based transmission system; and determining a latency of the transmission link based on a phase difference between the split portion of the electromagnetic test signal and the electromagnetic test signal received from the second network node.

18. A non-transitory computer-readable storage medium storing instructions which, when executed on at least one processor in a second network node, cause the second network node to perform operations comprising:

receiving from a first network node an electromagnetic test signal over a transmission link as a first Frequency-Division Multiplexed (FDM) signal comprised in a first electromagnetic carrier also comprising payload data, wherein the electromagnetic test signal is modulated on to a sub-carrier of the first electromagnetic carrier at the first network node and wherein the electromagnetic test signal is partially split and a split portion retained at the first network node prior to transmitting from the first network node to the second network node; and transmitting the electromagnetic test signal to the first network node over the transmission link, in response to receiving the electromagnetic test signal from the first network node, as a second FDM signal comprised in a second electromagnetic carrier also comprising payload data, in order to enable the first network node to determine a latency of the transmission link based on a phase difference between the split portion of the electromagnetic test signal retained at the first network node and the electromagnetic test signal received at the first network node after transmission from the second network node, wherein the first FDM signal and the second FDM signal are Sub-Carrier Multiplexed (SCM) signals, and wherein transmitting and receiving the electromagnetic test signal over the transmission link is performed using an SCM-based transmission system.

* * * * *